United States Patent [19]

Singer et al.

[11] 3,762,920
[45] Oct. 2, 1973

[54] REDUCTION OF ORES

[76] Inventors: **Alfred Richard Eric Singer;
David Anthony Roberts,** both of c/o Department of Metallurgy, University of Swansea, Singleton Park, Swansea, Glamorganshire, Wales

[22] Filed: Apr. 8, 1970

[21] Appl. No.: 26,704

[30] Foreign Application Priority Data
Apr. 15, 1969 Great Britain ................. 19,172/69
Oct. 15, 1969 Great Britain ................. 50,688/69

[52] U.S. Cl. ................. 75/208 R, 75/200, 75/222
[51] Int. Cl. ................................................. B22f 3/18
[58] Field of Search ................. 75/200, 208 R, 222

[56] References Cited
UNITED STATES PATENTS

| | | | |
|---|---|---|---|
| 2,900,254 | 8/1959 | Raiklen | 75/214 |
| 3,323,879 | 6/1967 | Kerstetter et al. | 75/208 |
| 3,331,684 | 7/1967 | Storchheim | 75/222 |
| 3,330,654 | 7/1967 | Sweet | 75/222 |

FOREIGN PATENTS OR APPLICATIONS

| 485,121 | 7/1952 | Canada | 75/221 |
|---|---|---|---|
| 784,153 | 10/1957 | Great Britain | 75/208 |

*Primary Examiner*—Carl D. Quarforth
*Assistant Examiner*—B. Hunt
*Attorney*—Finnegan, Henderson and Farabow

[57] ABSTRACT

Metal products of thin section are produced by chemical reduction of a compact containing an oxide or other reducible compound of the metal which is passed into a furnace in which it is reduced and sintered. The composition of the compact at least at a surface layer is such that the compact is sufficiently self-supporting to be passed through the furnace with additional support, at most, over only part of its surface. Preferably the compact contains a binder whereby it is self-supporting throughout its mass.

Best results are obtained by forming on one surface of the compact a metal layer either by reduction in situ or by the addition of a layer of the elementary metal. Sintering of this metal layer provides a strengthened skin which acts as a support to the rest of the compact during the final reduction and sintering operation. The technique is particularly applicable to production of metal strip e.g. by reduction of an iron oxide.

15 Claims, 2 Drawing Figures

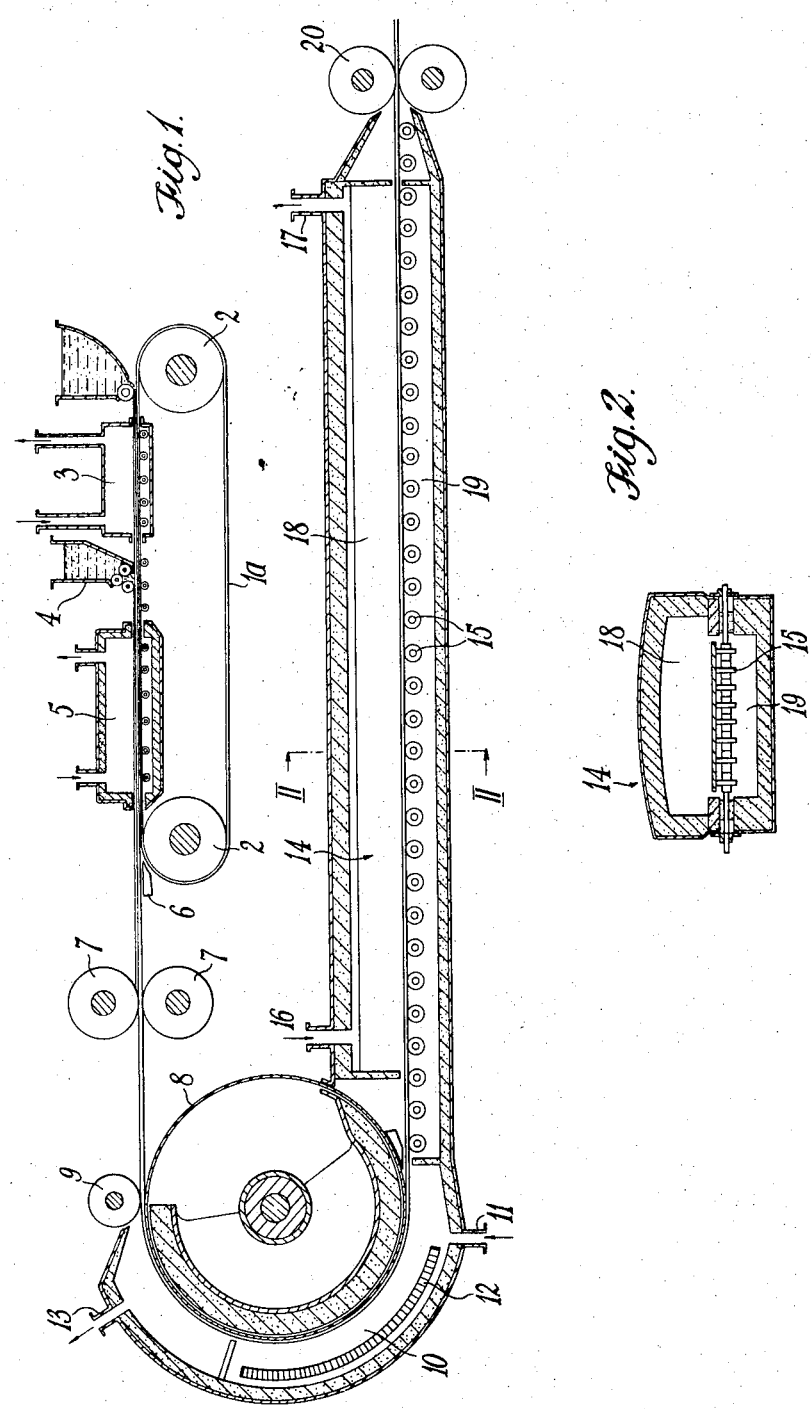

REDUCTION OF ORES

This invention relates to the fabrication of metals in forms of thin section and is particularly concerned with the production of iron and steel strip.

For many years the possibility of making metal strip from purified powdered ores has occupied the attention of those developing new metallurgical processes. Such a process would combine the benefits of a direct reduction route with those of powder metallurgy, but an economic route has yet to be found. It has been proposed to lay purified powdered iron ore in a shallow continuous bed, and to reduce and sinter this layer to a sponge iron which is subsequently hot rolled to form a steel strip. The chief difficulties are two-fold. Firstly, the sintering of a deep bed of loose powder is a slow process which involves long lengths of tunnel furnace and secondly the layer of ore is not self-supporting during its progress through the furnace. Both factors lead to increased costs and low throughputs which leave the process unable to compete with conventional methods.

The present invention comprises a process for the production of a metal product of thin section by chemical reduction of a compact containing an oxide or other reducible compound of the metal which is passed into a furnace in which it is reduced and sintered, characterised in that the composition of the compact at least at a surface layer is such that the compact is sufficiently self-supporting to be passed through the furnace with additional support, at most, over only part of its surface.

In order to achieve a compact which is self-supporting throughout its mass, the metal compound is preferably formulated with a binder substance. It is preferred that the minimum amount of binder consistent with adequate strip properties is used. The binder is preferably a material which does not leave undesirable residues when heated to a high temperature. The binders in use are, for example, gel-forming compounds such as cellulose derivatives, polymerising thermoplastic or thermosetting resins such as are commonly used in the foundry, for example, phenol formaldehyde resins containing plasticisers if desired, heavy oils, and non-deleterious metal compounds such as $FeCl_3$. They may be added dry or in an evaporatable solvent or carrier such as water or organic liquids. Additions of solid reducing agents such as carbon in in various forms may also be made to the binder at this time to facilitate reduction.

The oxide or other metallic compound and binder incorporated may be deposited as a layer on to a substrate which may be a flexible metal band or a rigid drum. If sufficient quantities of solvents or carrier liquids are added so that the mixture has the consistency of a slurry or thick paste, it may be extruded into the form of a thin strip or it may be deposited as a layer on a substrate which may be a flexible metal band or a rigid drum suitably treated with releasing agent in order to avoid sticking of the layer to the substrate. After drying and/or polymerising the binder, the layer is passed through a rolling mill where it is consolidated in the form of a strip.

The use of thermo-setting resins such as are commonly used in the foundry for Shell Moulding is particularly useful for obtaining strong self-supporting strip which will retain its general shape during subsequent reduction and sintering. In such cases the strip, after drying and/or partial polymerising, may with advantage be hot worked e.g. by being fed into a rolling mill with rolls maintained at elevated temperatures such that the particles of oxide in the strip are pressed closely into contact with one another and, at the same time, heated by contact with the hot rolls. This procedure of rolling at elevated temperatures has the beneficial effect of polymerising the binder and thus fixing the particles into the tightly packed position taken up during rolling. It also reduces the amount of binder employed because, during rolling, the binder is extruded between the grains of oxide and then fixed in place by polymerisation during the rolling process.

The self-supporting strip then passes directly into a reduction and sintering furnace in which the oxide is reduced to metal e.g. iron thus forming a porous strip. Because a considerable porosity develops when iron oxide changes into iron, the diffusion of reducing gases and water vapour into and from the layer is rapid.

Any residual carbon left from the heating and decomposition of the binder assists in the reduction of the metal oxide and indeed small amounts of carbon in powder form may be added to the oxide in the original mixing in order to facilitate reduction.

If during the mixing of the oxides with binder it is desired to produce a powder product rather than a slurry or paste, then a slightly different procedure may be used. The following procedure is particularly beneficial when thermosetting resins are used as binders. The oxides and binders are fed into a mixer as before. They may be mixed dry in a similar way to the mixing and coating of sand with binders for use with the well-known Shell Moulding process. However, it is frequently found that the coating of the oxide grains with a very thin film of resin is facilitated by mixing with small amounts of additional solvent, or with water and an emulsifying agent.

The mixture is then dried at a low temperature to avoid undue polymerisation of the binder and fed as powder into a rolling mill using either a saturated feed as in normal powder rolling or an unsaturated feed. The rolls may, with advantage, be heated to such a temperature that polymerisation occurs during the rolling process.

An unsaturated feed system employing a continuous heated flexible feeding band on to which the powder is metered has been found to be advantageous. In this case the feed band passes horizontally between the rolls and is then returned to the ingoing side. The band, which is conveniently made of thin polished stainless steel strip, is treated with a releasing agent. The metered powder is thus preheated by the band before entering the rolling mill, thus ensuring that polymerisation is well advanced by the time the strip leaves the rolling mill. Rolling load is maintained at such a level that plastic deformation of the band is avoided. The strip is then taken off the band and passes directly into the reduction and sintering furnace and subsequent treatment is similar to that described before.

It has also been found that by flash sintering a surface layer of the compact, if necessary in a reducing atmosphere, it is possible to provide a firm base on which the remaining part of the compact can subsequently be reduced, sintered, and if necessary melted.

The present invention therefore also comprises a process for the production of a metal product of thin section by chemical reduction of a compact containing an oxide or other reducible compound of the metal, in which one surface layer of the compact is sintered to provide a supporting surface which supports the compact throughout subsequent reduction thereof to metallic form, said surface layer being a metal layer.

As applied to the production of metal strip, the process of this invention is carried out by forming a layer comprising particles of the metallic compound, sintering a surface of the layer, if necessary in a reducing atmosphere, to provide a coherent support for the layer and subsequently passing the layer through a furnace to reduce and sinter the remainder of the layer. It has been found that by sintering a surface of the layer in this way, the layer may be made sufficiently self-supporting for subsequent passage through a reduction furnace with the minimum of additional support resulting in higher throughput rates. Preferably the layer is passed from the flash sintering zone to the reduction zone of a furnace whilst still at a high temperature.

The process of the invention may be carried out using a compact in which the metal is present totally in the form of the metal compound e.g. a metal ore and the outer supporting layer of metal is produced by flash reduction of the outer layer and sintering thereof in situ, but it is preferred to add to the surface of the compact a thin layer of particles of the preformed corresponding elementary metal e.g. in powder form and to sinter this layer of the metal. It is found that the layer of sintered metal usually has greater strength than a similar layer of reduced and sintered metal oxide. The thickness of the outer layer of metal may conveniently be from 3 to 20 percent of the total thickness of the compact and metal layer.

The invention may be applied to the reduction of a wide variety of metal compounds e.g. iron, copper, and nickel compounds. The compound most frequently used will be an oxide of the metal but we do not preclude the use of other conveniently reducible compounds e.g. in certain cases the chloride or mixtures of oxide and chloride. The process may be operated batchwise or continuously. It is of special application in the field of ferrous metallurgy and for convenience will be further described with particular reference to the production of iron and steel strip.

Thus the invention includes a process for the fabrication of ferrous or ferrous-based articles having a thin section which comprises forming a "green" strip or other form of compact containing particles of iron oxide, forming and sintering a metal surface layer on the compact, if necessary in a reducing atmosphere, to provide a coherent support for the compact and subsequently, whilst still at high temperature, passing the compact through a furnace to reduce and sinter the remainder of the iron oxide.

A sintered iron layer produced in the process is usually quite porous, and it will in these cases be necessary to compact the layer further to produce an iron or steel strip. This compaction is preferably carried out by hot working, for example in a rolling mill.

It will be appreciated that in order to achieve best results careful attention must be paid to the composition of the raw material. Thus, extraneous materials which are unwanted and which contaminate the resulting product should not be present in significant quantities. In the case of iron oxides it is highly desirable to operate with oxide of the order of at least 98 percent purity derived, for example, by purification of crude ores, from super-concentrates, from very pure natural ores, or from synthetic oxide materials. The iron oxide may be $Fe_3O_4$ or $Fe_2O_3$. $Fe_2O_3$ is often easier to reduce but it is generally found that $Fe_3O_4$ is easier to purify. $Fe_3O_4$ has the further advantage that it is possible to oxidise from $Fe_3O_4$ to $Fe_2O_3$ which causes general strengthening of the oxide layer. Thus in practice an $Fe_3O_4$ layer may be run through a short part of the furnace open to the atmosphere to convert it to $Fe_2O_3$ and thence into a reducing atmosphere without cooling. An alternative raw material is a partially reduced purified oxide. This material is found to give a good green strength after rolling and prior to sintering because of the presence of surface skins of iron.

Additions of alloying elements such as, for example, nickel in the form of oxides and manganese as ferro-alloy powder may be made either to the iron oxide or iron powder feed or both. Fibrous reinforcing elements may also be included if desired.

It is generally desirable to incorporate a binder in the raw material to enable metering and consolidation to be carried out efficiently. The binder is preferably a material which does not leave undesirable residues when heated to a high temperature. The binders in use are, for example, gel-forming compounds such as cellulose derivatives, polymerising or thermosetting resins such as are commonly used in the foundry, for example, phenol formaldehyde resins containing plasticisers if desired, heavy oils, or non-deleterious metal compounds such as $FeCl_3$. They may be added dry or in an evaporating solvent or carrier such as water or organic liquids. Additions of solid reducing agents such as carbon in various forms may also be added at this time to facilitate reduction. The oxide or other metal compound and binder may be deposited as a layer on to a substrate which may be a flexible metal band or a rigid drum. As an alternative, the layer may be extruded from a suitable extrusion apparatus.

The iron oxide, after drying and/or polymerising the binder when one is used, is passed through a rolling mill where it is consolidated in the form of a green strip after which it is passed into a furnace in which flash reduction and sintering of at least one surface is accomplished in a reducing atmosphere without causing substantial heating of the underlying oxide. A suitable heating system makes use of high temperature radiant tubes or radiant elements disposed on one side of the oxide strip. Microwave heating may also be used. The flash heating treatment causes a thin skin of oxide to be reduced to iron and sintered to form a strong coherent thin layer. It is arranged that this subsequently forms the underlying part of the strip and therefore supports it mechanically. The self-supporting strip then passes directly into a reduction and sintering zone of a furnace in which the remaining oxide is reduced to iron and sintered to form sponge iron firmly adherent to the underlying supporting base. Because the upper surface of the oxide is exposed to the furnace atmosphere and because a considerable contraction in volume occurs when iron oxide changes into iron, the diffusion of reducing gases and water vapour into and from the layer is rapid.

Any residual carbon left from the heating of the binder assists in the reduction of the iron oxide and indeed small amounts of carbon in powder form may be added to the oxide in the original mixing in order to facilitate reduction.

If it is desired to increase the strength of the supporting skin by means of the additional layer of iron, the thin layer of iron powder may be added to the oxide either before or after the latter has been dried, polymerised or consolidated. After removing from the substrate the composite layer is passed through a rolling mill to further consolidate the iron and oxide powders after which it is passed into a furnace in which flash sintering of the iron powder surface is accomplished as described previously. As an alternative to radiant heating high frequency induction heating may be used. The sintering treatment causes the iron powder to coalesce to form a strong thin layer. It is arranged that this subsequently forms the underlying part of the composite layer and therefore supports it mechanically. The self-supporting composite layer then passes directly through a reduction and sintering zone of the furnace as previously described.

In both cases, i.e. with or without an additional iron powder layer the layer on issuing from the furnace is hot worked e.g. rolled to produce iron or steel strip of high density having good mechanical properties.

The reducing atmosphere in the flash heating zone of the furnace and the main reduction and sintering zone may consist of hydrogen or hydrogen and nitrogen and/or hydrocarbons and/or a suitable mixture of CO and $CO_2$. Suitable surface temperatures for flash heating range from 1,100°C upwards. Suitable and convenient temperatures for use in the main reducing and sintering zone range from 1,000°C to 1,200°C. The carbon content of the steel may be adjusted by maintaining an appropriate $CO/CO_2$ and/or $H_2$/hydrocarbon ratio, preferably at the outlet of the furnace, or by adding sufficient carbon during mixing to give the required residual carbon content in the final strip.

Towards the end of the furnace the sintered iron layer is allowed to cool in a cooling zone to a suitable hot rolling temperature after which it is fed directly into the rolling mill or other compacting device. It is desirable that the layer remains in contact with a reducing environment up to the nip of the rolling mill or the corresponding part of any alternative compacting device. Indeed, it is also preferred that when the compacted strip leaves the rolling mill and throughout its subsequent processing, steps are taken to minimise the degree of oxidation of the metal.

After reduction is complete, but before hot rolling, a layer or layers of a different metal or alloy may be added to the iron layer so that the action of hot rolling causes a strong bond to form, giving a composite strip. Similarly two sintered iron layers can be firmly welded together by hot rolling.

The invention is illustrated in the accompanying schematic drawings of an apparatus for producing strip in which:

FIG. 1 represents a side elevation in section; and
FIG. 2 represents a section along the line 0 — 0' of FIG. 1.

The apparatus comprises a hopper 1 containing a thick slurry of iron oxide, mixed with a polymerisable organic binder dispersed in water and optionally containing fibrous reinforcing material, which is metered on to a continuous flexible steel band 1a, the surface of which has been treated with a releasing agent, driven by means of two drums 2. The slurry is partially dried and polymerised in a hot air chamber 3. The strip passes to a roller coater 4 where a thin layer of iron powder slurry is laid down on the surface of the strip. The coatings are then fully dried and polymerised in the furnace 5. The strip, which typically consists of 0.25 inch oxide and 0.015 inch iron is stripped from the band by a knife 6 and passes through a rolling mill 7 where it is consolidated. The strip then passes on to a drum 8. It is convenient, although not essential, to dispose a roller 9 where the strip meets the drum 8 to ensure that when the strip conforms to the periphery of the drum 8 the outside layer of iron powder does not crack. The strip then passes into a flash sintering chamber 10 fed with hydrogen at 11 in which radiant elements 12 flash sinter the surface layer of iron and form it into a strong, dense and ductile layer.

The underlying oxide does not reach a high temperature and its reaction with the reducing gases in the flash sintering chamber 10 is small. The hollow drum 8 remains relatively cold and may with advantage be constructed with a porous or perforated surface to enable any gases evolved from the oxide region to be extracted. The hydrogen from the chamber 10 escapes partly at 13 and partly into the furnace 14.

As a result of passing around the drum 8 the composite strip is inverted and passes directly into a long furnace 14 with the strong iron layer underneath, supporting the more fragile oxide. The composite strip is therefore strong and sufficiently self-supporting to run over an intermeshed roller conveyor hearth 15 of the furnace 14. The strip proceeds through the furnace, reacting with hydrogen fed in at inlet 16 and heated by radiant tubes (not shown) causing the iron oxide to be reduced to sintered iron. Hydrogen and water vapour leave the furnace via the outlet 17.

The special characteristics of the process whereby the strip is composed of a strong sintered bottom layer bonded to an upper spongy layer of iron allows the furnace chamber to be constructed in two parts. The top part 18 can thus be run at a higher temperature, say 1,200°C, than the bottom 19 at say 1,000°C. This allows reduction and sintering of the oxide to proceed rapidly yet enables the roller conveyor hearth 15 to be maintained at a lower and more convenient operating temperature. During reduction the volume of oxide shrinks to approximately one half its volume of iron so that the top portion of the strip is spongy. The shrinkage caused by reduction and sintering brings about a small decrease in thickness.

After full reduction and sintering the strip is hot rolled whilst still under reducing atmosphere on the rolling mill 20 to produce dense homogenous iron or steel strip having good mechanical properties. The thickness of hot rolled strip produced from a green strip of thickness of 0.265 inch at 6 is approximately 0.080 inch.

The apparatus used when the additional iron powder layer is not required is identical to that of FIGS. 1 and 2, except that the roller coater 4 and the furnace 5 are omitted. It is however necessary to extend the chamber 3 in order to ensure that drying and/or polymerisation is carried out to a sufficient extent to enable reduction and sintering to proceed rapidly in the flash heating furnace 10.

The apparatus used when the flash sintering step is not used is identical to that of FIGS. 1 and 2 except that the members 8 to 12 are omitted and the furnace 14 is disposed in line with the rest of the apparatus and to the left of the rolls 7 from which the strip enters the furnace directly or after additional treatment if desired.

We claim:

1. A process for the production of a metal product of thin section by chemical reduction of a compact containing a reducible compound of the metal which is passed into a furnace in which it is reduced and sintered, which comprises the steps of (1) forming a compact of particles of a reducible metal compound and a binder, (2) forming and flash sintering a metal layer on the surface of the compact, which metal layer, after forming and sintering, is capable of supporting the compact of particles of a reducible metal compound, and (3) thereafter reducing and sintering said reducible metal compound.

2. A process of claim 1 in which the metal layer is formed by applying metal particles to a preformed compact of said reducible metal compound.

3. A process according to claim 1, in which the thickness of the metal layer is from 3 to 20 percent of the total thickness of the compact and metal layer.

4. A process according to claim 1 in which an iron product is obtained by reduction of a compact containing iron oxide.

5. A process according to claim 4, in which the iron oxide has a purity of at least 98 percent.

6. A process according to claim 4, in which the iron oxide comprises $Fe_2O_3$, $Fe_3O_4$, or mixtures of these.

7. A process according to claim 4, in which the compact comprises a partially reduced iron oxide.

8. A process according to claim 5 in which said flash sintering is carried out at 1,100°C or higher, and the subsequent reducing and sintering is carried out at 1,000°–1,200°C.

9. A process according to claim 1 in which alloying material selected from the group consisting of metal and metal compounds is added to said reducible metal compound prior to forming the compact.

10. A process according to claim 1, in which the reduced compact is subjected to hot working immediately following the reduction.

11. A process according to claim 10 in which hot working is carried out in a reducing atmosphere.

12. The process of claim 1 in which said metal layer is formed in situ on the surface of said compact by flash reduction of an outer layer of the reducible metal compound of said compact.

13. The process of claim 12 in which said compact is passed to a first zone where said metal layer is formed on a surface of the compact by flash reduction and sintering and thereafter passed to a second zone, while still at an elevated temperature from treatment in said first zone, where said reducible metal compound is reduced and sintered.

14. The process according to claim 1 in which said compact is produced by forming a slurry comprising said reducible metal compound and a binder, depositing said slurry on a substrate, drying said slurry, and consolidating the resultant dried layer by rolling.

15. The process of claim 1 in which said compact is in the form of a strip and in which said product is produced by forming a metal layer on one surface of said strip and thereafter reducing and sintering said reducible metal compound, with said strip oriented so that said metal layer is on the bottom of said strip, in a furnace in which the temperature in said furnace above said strip is higher than the temperature in said furnace below said strip.

* * * * *

UNITED STATES PATENT OFFICE
CERTIFICATE OF CORRECTION

Patent No. 3,762,920     Dated October 2, 1973

Inventor(s) Alfred Richard Eric Singer; David Anthony Roberts

It is certified that error appears in the above-identified patent and that said Letters Patent are hereby corrected as shown below:

Page 1, Col. 1, after listing of the inventors, please insert the following:

[73] ASSIGNEE: National Research Development Corporation London, England, a corporation of Great Britain Signed and sealed this 26th day of February 1974.

(SEAL)
Attest:

EDWARD M. FLETCHER, JR.
Attesting Officer

C. MARSHALL DANN
Commissioner of Patents